United States Patent
Brombach et al.

(10) Patent No.: US 11,705,737 B2
(45) Date of Patent: Jul. 18, 2023

(54) METHOD FOR FEEDING IN ELECTRICAL POWER BY MEANS OF A WIND POWER INSTALLATION

(71) Applicant: Wobben Properties GmbH, Aurich (DE)

(72) Inventors: Johannes Brombach, Berlin (DE); Tobias Fredewess, Aurich (DE)

(73) Assignee: Wobben Properties GmbH, Aurich (DE)

( * ) Notice: Subject to any disclaimer, the term of this patent is extended or adjusted under 35 U.S.C. 154(b) by 85 days.

(21) Appl. No.: 17/387,481

(22) Filed: Jul. 28, 2021

(65) Prior Publication Data

US 2022/0037889 A1 Feb. 3, 2022

(30) Foreign Application Priority Data

Jul. 29, 2020 (EP) ..................................... 20188425

(51) Int. Cl.
*H02J 3/46* (2006.01)
*H02J 3/38* (2006.01)

(52) U.S. Cl.
CPC ................ *H02J 3/46* (2013.01); *H02J 3/381* (2013.01); *H02J 2203/20* (2020.01); *H02J 2300/28* (2020.01)

(58) Field of Classification Search
CPC .......... H02J 3/46; H02J 3/381; H02J 2203/20; H02J 2300/28; Y02E 10/76
USPC .......................................................... 307/19
See application file for complete search history.

(56) References Cited

U.S. PATENT DOCUMENTS

| | | | |
|---|---|---|---|
| 2012/0063182 A1 | 3/2012 | Laforga Gallo et al. | |
| 2015/0103574 A1* | 4/2015 | Hintz | H02M 1/42 |
| | | | 363/132 |
| 2018/0233908 A1* | 8/2018 | Chik | H02J 3/381 |
| 2018/0254707 A1* | 9/2018 | Matsuura | H02M 3/1584 |

FOREIGN PATENT DOCUMENTS

| | | |
|---|---|---|
| DE | 102012212181 A1 | 1/2014 |
| EP | 1768223 A2 | 3/2007 |
| EP | 2141790 A2 | 1/2010 |
| WO | 2010108928 A1 | 9/2010 |

* cited by examiner

Primary Examiner — Richard Tan
(74) Attorney, Agent, or Firm — Seed IP Law Group LLP

(57) ABSTRACT

A method for feeding electrical power into an electrical supply network using an inverter-controlled infeed unit is provided. The infeed unit has an inverter arrangement with a plurality of inverters to generate an output power and feed same into the network. Each inverter has an associated isolating switch to galvanically isolate the respective inverter from the network. Each inverter has a circuit composed of switches to generate an output current using pulsed actuation. Each inverter generates a variable partial power, and the output power is a sum of all partial powers. Depending on the output power, one or more of the inverters are operated as active inverters that respectively generates a partial power. The other inverters are operated as passive inverters that do not generate a partial power. One or more of the passive inverters are operated as blocked inverters and remain galvanically connected to the network.

24 Claims, 3 Drawing Sheets

METHOD FOR FEEDING IN ELECTRICAL POWER BY MEANS OF A WIND POWER INSTALLATION

BACKGROUND

Technical Field

The present invention relates to a method for feeding electrical power into an electrical supply network by means of an inverter-controlled infeed unit, in particular by means of a wind power installation or a storage system. The present invention furthermore relates to an inverter-controlled infeed unit, in particular a wind power installation or a storage system.

Description of the Related Art

Wind power installations are known, and these generate electrical power from wind and feed same into an electrical supply network. Modern wind power installations use a plurality of inverters connected in parallel for this purpose. Depending on the nominal power of the wind power installation, typically 15 inverters can be connected in parallel for this purpose, or even more. However, if the wind power installation is operated with less than the nominal power, in particular when the wind speed is below a nominal wind speed, not all of the inverters are required.

If, in the case of such operation and nominal power of the wind power installation, all of the inverters are still used, but with correspondingly reduced power, they operate less efficiently. To increase the efficiency, provision can then be made for just some of the inverters to be operated, specifically as far as possible at nominal power in each case. The other inverters meanwhile can be disconnected. If the wind power installation thus generates, for example, an output power at the level of half of the nominal power, provision can thus be made for only half of the inverters to be in operation.

Through such a measure, although it is possible to increase the efficiency, the wind power installation can then, in such a reduced operation, exhibit losses in the case of possible tasks of network backup of the electrical supply network. Such a task of the network backup can be the infeed of reactive power, particularly in the case of a network fault, that is to say, in particular, in the case of a voltage dip. The infeed of reactive power depends only a little on the available active power, that is to say depends only a little on the available wind power. As a result of the fact that only some of the inverters are operated, however, the reactive power that can be fed in is thus also reduced accordingly. If all of the inverters are in operation, a reactive current at the level of a nominal current of the wind power installation could be fed in. If not all of the inverters are in operation, this reactive current that can be fed in is reduced accordingly.

This therefore results in the dilemma that, during operation with reduced power, either the inverters are operated inefficiently or a maximum value of the possible reactive power infeed is reduced.

It could be possible to find a compromise by virtue of more inverters feeding in than necessary, but also not all of the inverters being operated for the purpose of infeed. Nevertheless, the efficiency of the infeed is then reduced, even if to not so great an extent, while at the same time more reactive power can be fed in; the technically possible maximum reactive power infeed nevertheless cannot be achieved. To remedy this, optionally all of the inverters can be operated when a network backup request is to be expected; otherwise, the efficiency can have priority and accordingly few inverters only are operated.

However, the problem on which this is based is that, in the event of a sudden, unexpected need for as much reactive power infeed as possible, this need cannot be fulfilled if it was not foreseeable.

In the European priority application the European Patent Office has searched the following prior art documents: EP 1 768 223 A2; WO 2010/108928 A1; US 2012/063182 A1; EP 2 141 790 A2 and DE 10 2012 212 181 A1.

BRIEF SUMMARY

Provided herein is an inverter-controlled infeed unit, in particular a wind power installation or a storage system, that operates as efficiently as possible and at the same time also spontaneously can also feed in as much reactive power as possible, even during operation with reduced output power.

A method for feeding electrical power into an electrical supply network is thus proposed. This is effected using an inverter-controlled infeed unit. In particular, provision is made for the inverter-controlled infeed unit to be a wind power installation. However, consideration is also given to a storage system that may have a high storage capacity and can feed electrical power into the electrical supply network from the store when required. It is therefore also possible, in a manner depending on the situation, particularly depending on a situation of the electrical supply network, for such a storage system to feed in a power below a nominal power that can be fed in by said storage system. The features according to the disclosure and also features in accordance with further embodiments according to features of wind power installations that are to be explained are described below. These descriptions are also to be understood analogously as descriptions regarding a method for feeding in by means of a storage system and also for the storage system as such, even if this is not expressly mentioned. By way of precaution, it is noted that a storage system can also be controlled depending on a wind speed, specifically, to express it by way of example, in order to compensate for wind power lacking in the case of calm weather.

In any case, the inverter-controlled infeed unit has an inverter arrangement with a plurality of inverters in order to generate an output power and to feed same into the electrical supply network as electrical power. In this case, the inverters are arranged in a parallel circuit. As a result, the generated powers thereof add up. In particular, the generated output currents thereof, which can also be referred to as partial output currents for each inverter, add up for this purpose.

Furthermore, each inverter has an associated isolating switch in order to galvanically isolate the respective inverter from the electrical supply network. Such an isolating switch can be actuated in an active manner in order to perform said galvanic isolation.

Each inverter has a circuit arrangement composed of semiconductor switches in order to generate the most sinusoidal output current possible by way of pulsed control of the circuit arrangement. In this respect, in particular a conventional inverter is used here. An inverter that operates using a tolerance band method is preferably used. As a result, the current, namely the partial current of each inverter, can be controlled in a targeted manner because the tolerance band method in each inverter detects the respectively generated partial current as a partial output current and checks whether it is in a specified tolerance band. The semiconductor switches are controlled in a manner dependent thereon. Therefore, current control can be carried out and as a result the currents can be adjusted very accurately.

Each inverter is prepared to generate in each case a variable partial power, wherein the output power results as the sum of all of the partial powers. A partial power is to be understood, in particular, as active power. However, it can also be considered to be reactive power or apparent power.

The fact that the output power results as the sum of all of the generated partial powers also means that the inverters are connected in parallel with one another. Each inverter has an output, at which the partial current is also provided, and all of these outputs or partial outputs of the inverters are then connected to a node at which the partial powers or the partial currents are added to the output power or to a corresponding output current.

It is then proposed that the inverters can be operated differently or else not operated depending on a level of the output power.

One or more of the inverters are operated as active inverters. Each active inverter generates in each case a partial power. In the ideal case, said partial power corresponds to the nominal power of the inverter. However, it may also be below it.

The other inverters of the inverter arrangement are operated as passive inverters. Each passive inverter does not generate a partial power. The passive inverters are thus not involved in the generation of the output power. However, this does not preclude that, for reasons that are partly yet to be described, a low current is output by the passive inverter or flows into the passive inverter. In particular, the passive inverters can remain galvanically connected to the network, with the result that a low filter current can flow from the network into the corresponding inverter. However, there is no active generation of power, in particular no active power. In particular, no current flows via the semiconductor switches of the circuit arrangement of the passive inverter.

Provision is now further made for one or more of the passive inverters to be operated as blocked inverters and to remain galvanically connected to the electrical supply network. In particular, specifically the aforementioned isolating switches remain closed. The blocked inverters are in this respect blocked from the operation thereof but are not isolated from the electrical supply network.

Here, it has been recognized, in particular, that, by blocking individual inverters, it is likewise possible to achieve a situation in which these inverters do not generate electrical power, with the result that only the active inverters generate power and all of the active inverters generate the output power together. The active inverters can be operated efficiently as a result.

At the same time, however, it has been recognized that such a blocked inverter can immediately take up the infeed of electrical power, that is to say the generation of a corresponding current, when required. Therefore, a situation is achieved in which, when required, reactive power or reactive current can be provided even by the blocked inverters, even though they are not involved in the generation of the output power at least at that time. At the moment at which a blocked inverter feeds in reactive current or reactive power, the blocking thereof is of course canceled and at that moment it changes from a passive inverter to an active inverter. As a result of the fact that it was, however, up to that point only a blocked inverter, that is to say not an inverter that was isolated from the electrical supply network, the taking up of such reactive current generation or reactive power generation can take place practically without delay. A certain physically unavoidable delay is, of course, always present, but this sudden infeed of reactive power by a previously blocked inverter can be taken up as rapidly as in the case of an active inverter.

In particular, this solution differs from a previously known variant in which the inverters that are not intended to contribute to the generation of the output power were switched off and also were galvanically isolated from the electrical supply network by opening the isolating switch thereof. It is possible that all of the passive inverters are operated as blocked inverters; however, consideration is also given to the fact that some of the passive inverters, or at least one of the passive inverters, is treated differently to a blocked inverter, which will be described in more detail below.

In accordance with one embodiment, it is proposed that each blocked inverter does not generate a partial power by virtue of the pulsed actuation being suppressed, and each blocked inverter ends the suppression of the pulsed control and generates a partial power in response to a triggering signal without delay. No time-consuming steps thus need to be taken in order to generate a partial power immediately when required even using a blocked inverter. This is achieved by virtue of the fact that the pulsed actuation is taken up immediately in response to the triggering signal.

This is achieved, in particular, by virtue of the fact that the blocked inverter differs from an active inverter essentially only in that the pulsed actuation is blocked. Such blocking is implemented, in particular, in software, which achieves a situation in which no control pulses at all reach the blocked inverter. In precisely this way, however, this change can be canceled immediately by software, with the result that corresponding control signals can then reach the blocked inverter. In that moment, the blocked inverter is then, of course, no longer a blocked inverter.

In particular, the blocked inverter can have a DC voltage intermediate circuit having an operationally ready intermediate circuit voltage, that is to say having an intermediate circuit voltage that corresponds to the level of the intermediate circuit voltage of the active inverters. If the pulsed actuation is then commenced, a partial power can also be generated immediately.

A triggering signal for this can be an explicit signal that a network operator transmits, for example, It may also be a signal that is generated in the inverter or the inverter arrangement, for example a voltage drop or a voltage increase of the network voltage or at corresponding output terminals of the inverter can lead to the inverter or the inverter arrangement generating such a triggering signal.

The suppression of the pulsed actuation is then ended without delay. The triggering signal then leads immediately to the commencing of the pulsed actuation, that is to say without delay. Of course, there are also physical transit times here, which requires an actuation signal, in order to reach from a control device of the inverter to the circuit arrangement of the same inverter. Semiconductor switches of the circuit arrangement themselves also require certain minimum times in order to implement the circuit. However, these are all times that also arise in the case of the active inverters and in this respect the instantaneous ending of the suppression of the pulsed actuation is not delayed anyway with respect to pulsed actuation of an active inverter. Such theoretically describable delay times are negligible in this respect and, in particular, at their maximum value are a few ms, at least less than 10 ms. In this case, these times are negligible and such short times are also to be understood as instantaneous in this case.

When each blocked inverter does not generate a partial power by virtue of the pulsed actuation being suppressed, the blocked inverter can furthermore or alternatively be operated in a standby mode. In this standby mode, said blocked inverter has the full functionality of an active inverter with the difference, that is say the exception, that the pulsed actuation is suppressed. In other words, a blocked inverter is accordingly, in particular, an active inverter that is not actuated, however. Accordingly, activation of a blocked inverter is readily possible by virtue of it being actuated. Said blocked inverter then changes its functionality from that of a blocked inverter to that of an active inverter. This process is then only the performance of an actuation of the circuit arrangement of the relevant inverter. As a result, said blocked inverter then changes its function from that of a blocked inverter to that of an active inverter.

In accordance with one embodiment, it is proposed that the wind power installation is characterized by a maximum power as upper limit for the output power, and all of the inverters are operated as active inverters and respectively generate a partial power when the output power has reached the maximum power, and one or more of the inverters are operated as passive inverters and do not generate a partial power when the output power is below the maximum power at least by a predeterminable power interval.

When the wind power installation is working to full capacity, all of the inverters are operated as active inverters. All of the inverters thus generate a partial power as contribution for the output power. The maximum power can be, in particular, a nominal power of the wind power installation. However, if the output power is below the maximum power at least by a predeterminable power interval, not all of the inverters are operated as active inverters. Instead, at least one inverter is operated as a passive inverter, in particular as a blocked inverter. The power interval is, in particular, as great or at least as great as a nominal power of an inverter. The nominal power of an inverter is in this respect a partial power or partial nominal power of the inverter.

The maximum power, the output power and the power interval can be checked as apparent power, active power or reactive power. In this respect, in each case the power term can be understood here as apparent power, active power or reactive power. The check can be carried out by checking an infeed power current, an infeed active current or an infeed reactive current. This type of check therefore depends on whether apparent power, active power or reactive power is being considered.

In particular, the check of the apparent power or the apparent current is useful because the current loading, which is essentially independent of the phase position, is taken into account as a result. By checking the active power or the active current, particularly the performance of the respective inverter can be taken into account. The consideration of the reactive power or of the reactive current can likewise be useful for taking into account a criterion particularly for a backup capability by way of reactive power infeed.

In accordance with one embodiment, it is proposed that a passive inverter or a plurality of passive inverters are operated as blocked inverters and remain galvanically connected to the electrical supply network, and a further passive inverter or a plurality of further passive inverters are operated as isolated inverters and are respectively galvanically isolated from the electrical supply network by way of their isolating switches.

The passive inverters can therefore be distinguished or be operated differently. One variant is that they are operated as blocked inverters. They then operate, in particular, like an active inverter, the actuation being suppressed, however.

The other variant is that they are operated as isolated inverters. They are then actually galvanically isolated from the electrical supply network, specifically by opening their isolating switches.

It has been recognized here, in particular, that it does not have to be necessary to operate all of the passive inverters as blocked inverters. In particular, the advantage of the blocked inverters is that they can be involved in power infeed again immediately. This is not possible using the isolated inverters, at least is not possible as quickly. For this purpose, it can be advantageous that a passive inverter is also galvanically isolated from the network. For example, in the case of an isolated inverter, creepage currents or circulating currents are prevented and the open isolating switch also results in protection from overvoltages in the electrical supply network and an additional reduction in the losses due to the currents in the network filter. It has therefore been recognized that a mixture is advantageously provided, according to which some passive inverters are operated as blocked inverters and others as isolated inverters.

In particular, provision can be made, depending on a fluctuation range of the generated wind power, for at least as many passive inverters as blocked inverters to be operated as would be necessary in order to generate power at the level of the fluctuation range. In this case, it has been recognized, specifically, that an inverter can rapidly switch its mode of operation between the mode of operation of the active inverter and the mode of operation of the blocked inverter. It is thus possible to achieve a situation in which only exactly as many inverters as is necessary for feeding in the present power are operated as active inverters, without a reserve having to be kept available for the fluctuation range. If such a reserve were to be necessary, a blocked inverter or a plurality of blocked inverters could immediately take over this task.

At the same time, it may be unfavorable to operate all of the passive inverters as blocked inverters since an isolated inverter can have advantages due to its galvanic isolation from the electrical supply network, in particular avoiding creepage currents or circulating currents. It is therefore proposed to operate some inverters as isolated inverters.

A filter circuit is optionally provided for each inverter in order to filter an output current generated by the inverter, and said filter circuit in the isolated inverters is also galvanically isolated from the electrical supply network in each case by way of the isolating switch of the relevant inverter. In this case, it has been recognized, in particular, that a current can flow through said filter circuit despite blocking an inverter. As a result, the isolating switch is arranged in such a way that it also galvanically isolates said filter circuit from the electrical supply network. Corresponding currents are therefore excluded. As a result, it may be advantageous for some passive inverters to operate them as isolated inverters, such that a filter current also cannot flow to or from the network. Any power fluctuations can be taken into account by some blocked inverters, such that isolated inverters frequently having to be reconnected and operated as active inverters is prevented as a result.

In accordance with one embodiment, it is proposed that a selection of the inverters as active inverters or as passive inverters and/or a selection of the passive inverters as blocked inverters or isolated inverters is effected depending on at least one of the following criteria.

Each of the two selections can be effected depending on a magnitude of an apparent current to be fed in, depending on a magnitude of an active current to be fed in or depending on a magnitude of a reactive current to be fed in. These dependencies can also be checked at the same time, but preferably of these only one magnitude is checked. As a result, in particular, checking of the apparent power, the active power or the reactive power can be effected. This has already been explained above, including the advantages.

Each of the two selections can also be effected depending on at least one detected loss of the inverter arrangement. In this case, particularly a comparison between generated and output active power can be performed. By changing the mode of operation of an inverter, said loss changes and this can be taken into account or concomitantly taken into account as a selection criterion.

Furthermore, consideration is given to one of the selections, or both, being effected depending on a detected temperature of the inverter arrangement and furthermore or alternatively depending on an intermediate circuit voltage of a joint DC voltage intermediate circuit of the inverter arrangement and furthermore or alternatively depending on a network voltage of the electrical supply network.

In particular, it is proposed to extend the checking of at least one current or one power by one of said latter criteria. In addition, the detected temperature of the inverter arrangement can thus be taken into account to monitor a power or a current. As a result of this, loading of the inverter arrangement can be identified alone or in addition. Provision is made, in particular, for the temperature measurement to be effected at an inverter that is operated as an active inverter. In this case, a first preselection can be made, in particular, by considering the output power or a corresponding current. It is then possible to readjust, where necessary, by monitoring at least one detected temperature. Particularly when the detected temperature is high, this can indicate a very severe loading of the active inverter and then provision can be made for at least one of the passive inverters to be operated as an active inverter in order to relieve the active inverters of load. In exactly the same way, a very low temperature can also lead to it being recognized that the active inverters are loaded instead to a weaker extent and, in order to increase the efficiency, an active inverter, or a plurality of active inverters, change their operation and are operated as passive inverters.

In particular, a sudden power increase in the wind power installation can be identified by means of intermediate circuit voltage, in particular specifically when the wind increases. It is then possible to react to this immediately in that at least one passive inverter, in particular blocked inverter, is operated as an active inverter and, as a result, can be involved in the generation of the output power by identifying the increasing power.

These two criteria, that is to say the monitoring of the temperature on the one hand and the monitoring of the intermediate circuit voltage on the other hand can also advantageously be combined. The temperature monitoring makes it possible to identify the actual loading while a rapid change in power is identified by the monitoring of the intermediate circuit voltage. Through monitoring the intermediate circuit voltage, it is of course also possible to identify a decreasing power and to operate at least one active inverter as a passive inverter in a manner depending thereon.

it has been recognized, in particular, that the temperature, particularly of the circuit arrangement, influences the efficiency. A circuit arrangement that is too hot or too cold operates less efficiently, that is to say has a poorer efficiency, than in an average temperature range. The same applies to the intermediate circuit voltage. If it is too low, the output voltage is difficult to achieve. If it is too high, this leads to rapid switching operations, in any case, when a tolerance band method is used, which is preferably proposed here. From the temperature and the intermediate circuit voltage, it is thus possible to derive an actual efficiency curve that can differ at least slightly from a static, precalculated efficiency curve, which specifies, in particular, a correlation between the efficiency and the generated power. Such a static, precalculated efficiency curve can at least be improved by taking into account the temperature and intermediate circuit voltage, in particular can be adjusted even during operation. The temperature and the intermediate circuit voltage thus have an effect on the efficiency and this can be taken into account. This can also produce synergy effects when the temperature and the intermediate circuit voltage are taken into account at the same time.

A selection depending on a network voltage of the electrical supply network can be made, in particular, in order to satisfy a need for backup power. Such a need can be recognized based on the network voltage, particularly the need for reactive power to be backed up.

In this case, two variants are considered in particular, specifically a need for an immediate backup power and a need for a backup power that can be expected or potentially expected. The decrease in the network voltage below a backup limit value can indicate an immediate need for a backup power. In this case, reactive power should be fed in immediately and blocked inverters can thus change their mode of operation for this purpose so that they become active inverters. This can relate to different numbers of passive inverters depending on the backup power need.

A need that can be expected or a need that can potentially be expected for a backup power can be identified, for example, by fluctuations in the network voltage in an electrical supply network. Fluctuations in the frequency are also considered here. If there are such fluctuations present, it is to be expected that a need for backup power can arise. If, however, there are hardly any fluctuations to be observed, it is instead to be assumed that there is no imminent need for a backup power.

If a need for a backup power is imminent or can be expected, it is proposed, in particular, that isolated inverters change their mode of operation so that they are operated as blocked inverters. In this case, it has been recognized, in particular, that the change from an isolated inverter to a blocked inverter can make use of a significant delay time. In particular, it is considered here that first of all the DC voltage intermediate circuit has to be charged. It may also be necessary to provide magnetizations of inductors. Such delay times may be so great that a suddenly arising need for a backup power cannot be satisfied sufficiently quickly. It is therefore proposed to change one, several or all of the isolated inverters to blocked inverters.

All of these criteria can also be combined. The actual loading of the inverter arrangement can be identified easily through temperature. Based on the intermediate circuit voltage, a generator-side change in power, in particular a change in the wind power available, can be identified quickly and a reaction thereto can be provided. Based on the network voltage, a need for backup power in the electrical supply network can be identified and a reaction thereto can be provided. The subvariants of monitoring a network voltage via the absolute amplitude thereof and monitoring fluctuations can also be combined since, in one case, blocked inverters are changed to active inverters and, in the other case, isolated inverters are changed to blocked inverters.

Both can arise at the same time and then expediently also be implemented at the same time.

One or both selections is or are preferably effected depending on a fluctuation range of the output power. The output power can fluctuate, in particular, due to fluctuating wind speed. In order to offset this fluctuation range, it is proposed to provide an appropriate amount of blocked inverters.

The one or more selections depending on a fluctuation range of the output power is or are also able to be combined with the other measures, since this taking into account of the fluctuation range of the output power takes into account, in particular, the variation of a wind speed, while the other mentioned criteria take into account other scenarios. The output power of a storage system can also vary depending on a wind speed, in order to compensate for power fluctuations of a wind power installation that feeds into the same electrical supply network.

In accordance with one embodiment, it is proposed that a behavior of the inverter arrangement is modeled by means of a model and a selection of the inverters as active inverters or as passive inverters and optionally a selection of the passive inverters as blocked inverters or isolated inverters is effected depending on a behavior of the model. The behavior of the inverters is therefore modeled by means of a model. The model therefore emulates the inverter arrangement. The inverter arrangement modeled in the model in this way can accordingly be operated at a present operating point. This operating point can be determined by the present infeed current, in particular the apparent infeed current, the present voltage and a temperature, in particular by an external temperature. In the model, it is then possible to identify whether overloading or low utilization is present or whether optimum operation is present.

Depending thereon, the inverters can then be selected accordingly as active inverters or passive inverters, in particular with the difference between blocked inverter and isolated inverter. The selection can be implemented as described in previous embodiments. In particular, the model can help to monitor the criteria, that is to say in particular the output power, a loss of the inverter arrangement, a temperature of the inverter arrangement, an intermediate circuit voltage, a network voltage and/or a fluctuation range of the output power. It is proposed, in particular, that these values or some of these values are gathered from the model. This is provided, in particular, so that the model is operated as far as possible at the same operating point and the corresponding values then result and in principle only need to be read out from the model. The model is preferably part of a state observer.

In particular, a power loss can be determined by means of the model and an efficiency of the inverter arrangement can be assessed thereby.

In accordance with one embodiment, it is proposed that a behavior of the inverter arrangement is modeled by means of the model and the model is simulated using a test configuration. To this end, it is proposed that the test configuration is prescribed by a selection of the inverters as active inverters or as passive inverters. Optionally, provision can additionally be made for the test configuration to be specified by a selection of the passive inverters as blocked inverters or as isolated inverters. The simulation is thus carried out, for example, using 10 active inverters, five blocked inverters and five isolated inverters when the inverter arrangement has a total of 20 inverters, to name one clear example.

This division is then the test configuration. The model is then simulated using this test configuration, for example for a specified period. The prescribed period can be, in particular, in the range of one minute to 15 minutes. As a result, essentially a short-term prediction can be carried out. However, consideration can also be given to the model, or multiple models in parallel, being operated permanently.

It is now proposed to vary the test configuration, that is to say for example to provide 11 active inverters, four blocked inverters and five isolated inverters as a further test configuration, in order to vary the above example. In this way, multiple test configurations can be formed and the model is simulated for each test configuration. A simulation result accordingly results for each test configuration.

Depending on the simulation results, a test configuration is then selected and accordingly implemented in the actual wind power installation. In particular, the selection of the test configuration is effected by evaluating boundary conditions.

In particular, the efficiency resulting for different test configurations is to be compared. In addition, however, boundary conditions that either can have an influence on the evaluation, for example by way of a quality criterion, or which stipulate fixed limits to be met are to be considered. It is then also possible to discuss taking into account boundary conditions. A boundary condition may be not to exceed a limit power value or a limit temperature.

All of the test configurations that have led to this boundary condition not being met, because a temperature became too high, for example, may then not be selected, even if they had led to the best efficiency.

A further boundary condition may be that a maximum partial current that may not be reached or exceeded is specified for each inverter.

In particular, provision can be made for the infeed device to be operated using a configuration that can thus be referred to as an operating configuration. In the model, another configuration can be set and simulated as a simulation configuration. Consideration can also be given to providing a plurality of simulation configurations. The operating configuration and the at least one simulation configuration can then be compared. If in the process a simulation configuration turns out to be more suitable, this can be selected as the new operating configuration. In this case, a minimum operating duration for which the infeed device is at least operated before a change is carried out can be provided as a boundary condition.

It is preferably proposed that, for a level of the output power, a selection of the inverters as active inverters or as passive inverters is made, the infeed device is operated using the selection made, or the model is simulated, a degree of efficiency is detected as the result of the operation or the simulation, and the selection is stored together with the level of the output power and the degree of efficiency as a reference configuration, optionally together with at least one characteristic or boundary condition, and after a change in the level of the output power a selection of the inverters as active inverters or as passive inverters is made depending on at least one reference configuration.

In this respect, an adaptive selection is made possible in a simple manner. The infeed device is operated using a selection and in the process provides a result, specifically an efficiency that therefore forms the efficiency measure. However, the efficiency measure can also be given by another variable, for example by a detected generated power, which can be compared with the output power.

It is then possible to provide a table, in which the relevant selection and the efficiency measure are stored depending on the level of the output power. It is also possible to provide a field instead of the table, in which field, for example, the output measure is stored depending on the level of the output power and depending on the selection, for example depending on the number of active inverters. In addition, at least one characteristic or boundary condition can be stored in the table, or in the field. A boundary condition may be, for example, a number of permitted changes per unit of time when this number can be selected to be different. A property may be an inverter temperature, all of the inverter temperatures, an average temperature, a maximum temperature difference between the highest and the lowest temperature of two inverters, or a temperature distribution.

Instead of operating the infeed device using the selection, it can also be simulated, and the procedure can otherwise be as during operation.

A database can be gradually supplied with reference configurations both through the simulation and also through the evaluation of an operation. In the case of a new level of the output power, the selection can then be effected by the reference configurations that have already been gathered. If there is no reference configurations for a level of an output power, a new one can be created, and/or there can be interpolation between at least two, or there can be extrapolation from at least one.

A selection is preferably made depending on at least one reference configuration in order that the infeed device is operated and for this purpose the efficiency measure is then detected again and, where necessary, the reference configuration is then updated when a change has resulted. A variation is preferably performed with respect to the reference configuration in order to check whether an improvement can be achieved. The variation can preferably take place in the model, such that in each case the best stored reference configuration, specifically with the best efficiency measure, is used for the operation of the infeed device, and in parallel a variation is carried out using a simulation.

In accordance with one embodiment, it is proposed that, from the inverters, a respective inverter temperature is detected, in particular respectively as a temperature of the circuit arrangement of the respective inverter, a specific selection regarding which inverter is operated as active inverter and which as passive inverter is made depending on the inverter temperatures, in particular wherein the specific selection is made depending on a comparison of the inverter temperatures, and wherein the specific selection is optionally changed depending on the inverter temperatures.

In this case, it has been recognized that it is not only relevant how many inverters are operated as active inverters and how many are operated as passive inverters, but also which inverters are selected specifically for this purpose. If, for example, there are 15 inverters present, it is possible, depending on the level of the output power, that the result is 10 inverters are operated as active and five are operated as blocked inverters. If the inverters are numbered from 1 to 15, for example the inverters number 1 to number 10 are operated as active inverters but the inverters number 11 to 15 are operated as blocked inverters.

If this exemplary selection is always made, the inverters number 1 to 10 age more rapidly than the inverters number 11 to 15. It is therefore proposed to make a temperature-dependent selection. In particular, it is proposed that inverters with a low temperature are more likely to be operated as active inverters than inverters with a high temperature. In the case of the inverters with a low temperature, this then increases, however, as soon as they are operated as active inverters, whereas the temperature of the passive inverters decreases. Accordingly, it is preferably proposed to switch the mode of operation of the inverters depending on the temperature, that is to say to change the specific selection. The inverters number 1 and number 11 can then switch their roles, for example. Inverters number 2 to 11 are then operated as active inverters and inverters number 12 to 15 and number 1 are operated as passive inverters.

In accordance with one embodiment, it is proposed that each inverter has a DC voltage intermediate circuit having an intermediate circuit voltage and an intermediate circuit control system, which keeps the intermediate circuit voltage in a voltage band, is provided for the blocked inverters. In this case, it has been recognized, in particular, that there may be designs in which the DC voltage intermediate circuits of the inverters are isolated. In this case, a classic disconnection of some inverters would also lead to the intermediate circuit voltage decreasing. In previous concepts, this is also desired since such disconnected inverters are not intended to contribute because only some inverters are intended to feed in for reasons of efficiency.

It has been recognized that it is advantageous to provide blocked inverters instead of disconnected inverters. With these blocked inverters, it is therefore proposed to keep the intermediate circuit voltage thereof in the voltage band that is required for infeed. This can ensure that, in the event of a sudden need for which a blocked inverter is intended to feed in, said inverter can also feed in immediately because the intermediate circuit voltage thereof has a suitable value therefor.

The intermediate circuit control system can be provided such that it controls, that is to say charges or recharges, the DC voltage intermediate circuit, for example by way of a generator-side step-up converter, when a wind power installation is present, in order to keep the voltage in the voltage band. However, consideration can also be given to the control of the intermediate circuit voltage being carried out on the network side by means of the inverter. For this purpose, some current can be conducted temporarily out of the network or from the active inverters into the DC voltage intermediate circuit, or else fed in, likewise temporarily, that is to say for a short time, in order to keep the intermediate circuit voltage in a prescribed voltage band. The power or amount of energy required for this is very low because ultimately only creepage currents have to be balanced, said creepage currents being able to lead to discharging or charging of the corresponding intermediate circuit capacitors. For example, the intermediate circuit can be actuated once every minute for 10 ms for this purpose.

In accordance with one configuration, provision is made, when an active inverter changes to a passive inverter, for the partial power generated by the active inverter before the change to be distributed across the remaining active inverter. As a result, a targeted transition can be created.

In this case, provision is made for a transition specification to be provided for the distribution. For this purpose, it is proposed that the transition specification specifies a temporal reduction profile for reducing the partial power of the changing active inverter. That is to say, if for the active inverter provision is made for it to be a passive inverter, the partial power of the active inverter is reduced in accordance with this temporal reduction profile, specifically to zero. The remaining active inverters can then continuously take on this power accordingly.

Furthermore or as an alternative, it is proposed that the transition specification respectively specifies a temporal increase profile for increasing the partial powers of the remaining active inverters. It is thus possible to specify in a targeted manner how the active inverters behave. They can accordingly increase their output partial power until they have taken on the partial power that until now the changing active inverter generated.

In particular, it is proposed that this temporal reduction profile for the changing active inverter and the temporal increase profile for the remaining active inverters are combined. In particular, it is proposed that a temporal reduction profile is provided for the changing active inverter and the temporal increase profile is determined depending thereon. This temporal increase profile is preferably distributed over the remaining active inverters uniformly.

In particular, it is proposed that the reduction profile and/or the increase profile are each formed as ramps that can be parameterized in a slope. Therefore, the temporal reduction is effected based on a decreasing ramp and the increase of this decreasing ramp can be parameterized. This can depend, in particular, on how quickly the power changes. A rising ramp, which can be parameterized, can accordingly be provided for the increase profile.

In accordance with one embodiment, it is proposed that a central control system is provided to control the inverter arrangement and the central control system monitors effects by selecting the active, passive, blocked and/or isolated inverters for operating states of the inverter arrangement. In this case, it has been recognized, in particular, that by selecting the inverters, that is to say, in particular, as a result of the fact that not all of the inverters are operated as active inverters, interactions between the inverters can arise or else individual inverters can exhibit reactions. For this purpose, the monitoring is proposed, which can, where necessary, lead to the selection of the inverters as active, blocked and/or isolated inverters being changed.

In particular, it is proposed to monitor the following.

It is proposed that a reaction of a chopper circuit is monitored. A chopper circuit is connected to a DC voltage intermediate circuit and can lead power away from said intermediate circuit, specifically by means of a resistor, in the case of an increased intermediate circuit voltage. This is also referred to as chopping. This makes it possible, in particular, to monitor whether such chopper control also functions as intended in the case of a blocked inverter. Based on a reaction of the chopper circuit, it is also possible to identify whether power is undesirably fed to the corresponding intermediate circuit, this power then leading to the chopper circuit being triggered. In this case, for example, a fault message can be output or the function of the blocked inverter monitored in this way can be changed, that is to say it can become an active inverter or an isolated inverter. However, its previous function should then be taken over by another inverter.

A further proposal is that an occurrence of circulating currents is monitored. By way of circulating currents, in particular the DC voltage intermediate circuits of the blocked inverters can be fed and kept at an operating level, that is say in particular can be kept in a voltage band. For this purpose, it is possible to monitor whether circulating currents that achieve this are present. In this case, it is also possible to monitor whether undesired circulating currents, which themselves continue to flow in the intermediate circuit when a desired voltage level is reached and as a result generate losses, are present. In this case, a warning can be output, or it is also possible, the same applies in the monitoring described above, for the specific control of the semiconductor circuit of the active inverters to be changed in response to a chopper circuit. In particular, switch delays can be provided for the active inverters, by way of which the active inverters can implement switching time delays with respect to one another. In this case, it has been recognized, in particular, that switching time delays between inverters that are connected in parallel can lead to corresponding circulating currents.

It is also proposed that a reaching of current limits is monitored. Such monitoring is proposed, in particular, for each inverter individually, in particular for each active inverter. A corresponding current sensor is provided at each inverter, but the evaluation can take place centrally in the central control system. Provision is made, in particular, when an inverter reaches a current limit, for the central control system to be able to control that a blocked inverter and/or isolated inverter is changed to an active inverter.

In particular, it is also proposed that the control of the inverter arrangement is changed depending on a result of the monitoring. This includes changing the function of an inverter or a plurality of inverters. That is to say changing from active inverter to a passive inverter or a blocked inverter and from an isolated inverter to a respective other one. However, consideration is also given to a specific actuation of the circuit arrangement of an inverter being changed, in each case. In this case, particular consideration is given to changing switching delays of the circuit arrangements with respect to one another and coordinating this by means of the central control system.

In accordance with one configuration, it is proposed that an expected change in power of the output power is predicted or specified. Such a prediction can be carried out depending on the wind, that is to say depending on a weather forecast. In this case, instances of turbulence, which are forecast or which are currently already identified, can also be taken into account. In the case of turbulent wind, significant changes in power are therefore to be expected.

The expected change in power that is predicted or specified can also be referred to synonymously as a change expectation. The inverters are thus selected depending on the change expectation.

Events on the network side can also lead to a change in power being expected, in particular a change in the apparent current, but also a change in the active current is considered. Particularly in the case of an expected network fault, provision can be made for this to have to be controlled. For such management, a rapid decrease in power and, a short time later, a rapid increase in power must be able to be implemented by the inverter arrangement. In such a case of fault management, which is also referred to as an FRT case, such a change in power can be expected permanently or provision can be made for the inverter arrangement to have to be permanently prepared for such an event.

In this case, too, changes in power can relate to active power, reactive power or apparent power and in this case, too, the specific implementation of the consideration of a corresponding current can thus also relate to active current, reactive current or apparent current.

For this purpose, it is now proposed that the inverters are divided depending on the change in power that can be expected.

It is therefore proposed to operate passive inverters as blocked or isolated inverters in a manner depending thereon. In this case, it has been recognized, in particular, that blocked inverters can react quickly to changes in power, specifically can be converted to active inverters quickly, which is not the case for isolated inverters.

In particular, it is proposed that the expected change in power is divided into a proportion of rapid changes in power and a proportion of slow changes in power and the more passive inverters are operated as blocked inverters, the greater the proportion of expected rapid changes in power. In this case, in particular, a practical solution is proposed, according to which the changes in power that can be expected, that is to say the change expectation, are classified. By way of this classification, it is possible to perform a clear division and, based on this, the proportion of blocked inverters to the passive inverters can be adjusted overall. The proportion of blocked inverters can also be 100% or 0%. In particular, the proportion will be high when a proportion of rapid changes in power is high, in particular when only rapid changes in power or else only a rapid change in power at a significant level is/are expected.

Furthermore, or as an alternative, it is proposed that a proportion of blocked inverters is in a range of 90%-100% when the change in the power is greater in terms of magnitude than 20% of a nominal power of the inverter arrangement per second. As a result, a very significant and rapid change in power can be defined. A change by 20% of the nominal power in one second means that the power changes by the nominal power in five seconds. If this is the case, predominantly blocked inverters should be used and as far as possible no isolated inverters. In particular, therefore, a proportion of 100% is then proposed. If this turns out to be somewhat lower, for example 90% or higher, there is still a very high proportion of blocked inverters.

An inverter-controlled infeed unit is also proposed, in particular a wind power installation or a storage system. The infeed unit comprises:
- an inverter arrangement with a plurality of inverters for generating an output power and for feeding the output power into the electrical supply network as electrical power, wherein
- each inverter has an associated isolating switch in order to galvanically isolate the respective inverter from the electrical supply network,
- each inverter has a circuit arrangement composed of semiconductor switches in order to generate the most sinusoidal output current possible by way of pulsed control of the circuit arrangement.
- each inverter is prepared to generate in each case a variable partial power, and wherein
- the inverter arrangement is interconnected such that the output power is produced as the sum of all generated partial powers, wherein
- a central control unit is provided to control the inverter arrangement and the central control unit is prepared to control the inverter arrangement such that,
- depending on a level of the output power,
- one or more of the inverters are operated as active inverters, wherein each active inverter respectively generates a partial power, and
- the other inverters are operated as passive inverters, wherein each passive inverter does not generate a partial power, wherein
- one or more of the passive inverters are operated as blocked inverters and remain galvanically connected to the electrical supply network.

In particular, the inverters of the inverter arrangement are connected in parallel so that the partial powers are combined as a sum to form the output power. The central control unit can implement control in particular for each inverter for this purpose. To this end, the central control unit can respectively transmit control signals to the inverters. Each inverter can itself have an individual control device and receive control signals from the central control unit. In this design, the central control unit can transmit an individual nominal power value, for example, to each inverter and each individual control device of the relevant inverter then converts this to specific control signals for the semiconductor switches of the circuit arrangement thereof.

It is also possible to specify via the central control unit which inverters are operated as active inverters and which are operated as blocked inverters, or which are operated as isolated inverters. The central control unit is therefore prepared to control the inverter arrangement accordingly. This may also include the fact that a selection specification is implemented in the central control unit, said selection specification selecting which inverters are operated as active inverters and which are operated as blocked inverters depending on an output power to be generated overall and possibly depending on further input variables and/or boundary conditions. In particular, each inverter can receive a blocking signal from the central control unit in order to be operated thereby as a blocked inverter and not to actuate the semiconductor switches thereof.

In particular, it is proposed that the infeed unit, in particular the central control unit thereof, is prepared to perform a method in accordance with one of the embodiments described above.

BRIEF DESCRIPTION OF THE SEVERAL VIEWS OF THE DRAWINGS

The invention is now explained by way of example in more detail below on the basis of embodiments with reference to the accompanying figures.

DETAILED DESCRIPTION

Figure 1:
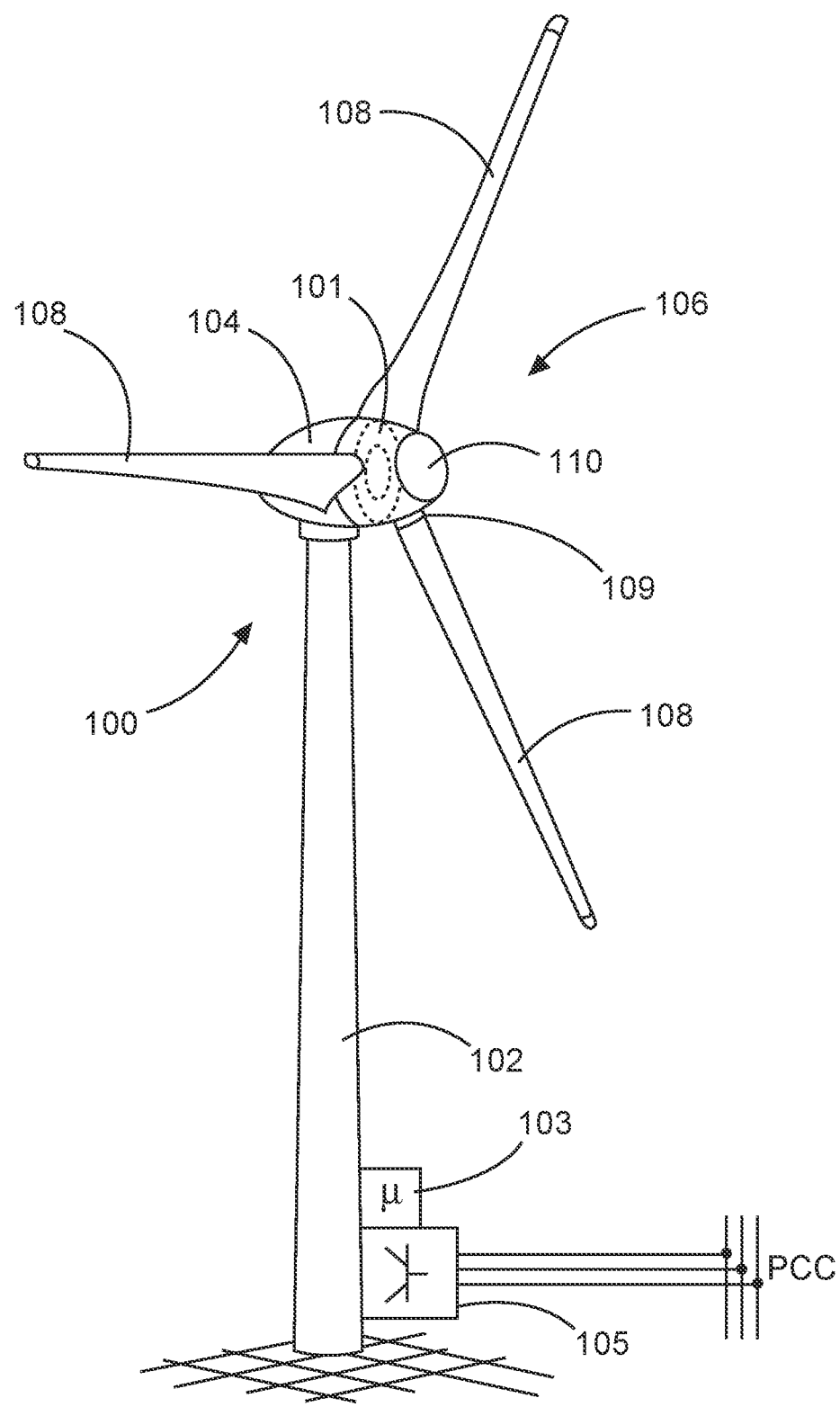
FIG. 1 shows a perspective illustration of a wind power installation.

FIG. 1 shows a wind power installation 100 having a tower 102 and a nacelle 104. Arranged on the nacelle 104 is a rotor 106 with three rotor blades 108 and a spinner 110. During operation, the rotor 106 is set in rotation by the wind and thereby drives a generator in the nacelle 104.

The wind power installation 100 in this case has an electric generator 101, which is indicated in the nacelle 104. Electrical power can be generated by means of the generator 101. An infeed unit 105, which can be designed, in particular, as an inverter, is provided to feed in electrical power. It is thus possible to generate a three-phase infeed current and/or a three-phase infeed voltage according to amplitude, frequency and phase, for infeed at a network connection point PCC. This can be effected directly or else jointly with further wind power installations in a wind farm. An installation control system 103 is provided for controlling the wind power installation 100 and also the infeed unit 105. The installation control system 103 can also acquire predefined values from an external source, in particular from a central farm computer.

Figure 2:
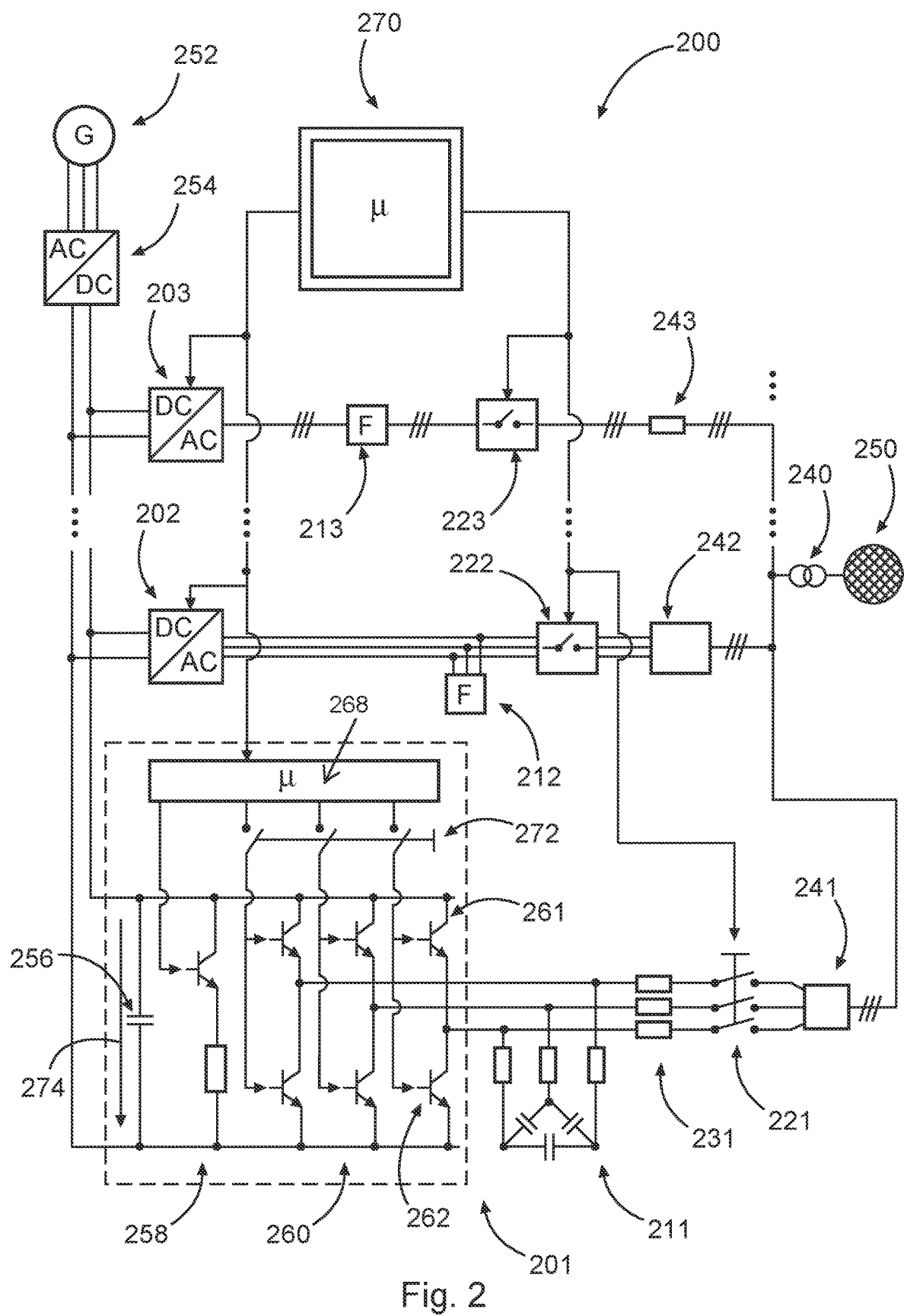
FIG. 2 shows an infeed unit in a structural and at the same time schematic illustration.

FIG. 2 shows an infeed unit 200. This infeed unit 200 has a plurality of inverters 201-203. These inverters 201-203 are illustrated in FIG. 2 to different degrees of detail, but in principle are intended to have an identical construction. The third inverter 203 is also representative of various further inverters. Each inverter 201-203 has an associated output filter 211, 212 and 213, respectively, as well as an isolating switch 221, 222 and 223, respectively. The output filters and isolating switches are also illustrated to different degrees of detail or partly illustrated only symbolically. They can also each be considered as part of the associated inverter 201-203. With respect to the first inverter 201, an output inductor 231 is also illustrated. Such an output inductor is also to be provided for the other inverters in each case and has not been illustrated purely for the sake of better clarity.

A connection point 241-243 is also provided for each inverter and a joint transformer 240 is also shown.

In accordance with the illustration of FIG. 2, the infeed unit 200 therefore feeds into an electrical supply network 250 via the joint transformer 240. However, consideration is also given to the infeed unit 200, in particular if it is designed as a wind power installation, being arranged in a wind farm and then not feeding into an electrical supply network independently but into a farm network into which further infeed units feed. The farm network can then be connected to the electrical supply network and thereby feed the total power of the farm, and hence also the output power of the infeed unit 200, into the electrical supply network.

The infeed unit 200 has a generator 252 as energy source, said generator generating an alternating current that can be rectified by means of a rectifier 254. The rectifier 254 thus provides a DC voltage or a direct current for the inverters 201-203. This DC voltage is then provided in a DC intermediate circuit that each inverter 201-203 has. For this purpose, an intermediate circuit capacitor 256 representative of this is shown in the first inverter 201. In terms of the structural design of the infeed unit of FIG. 2, the DC voltage intermediate circuits of the inverters 201-203 are therefore galvanically connected to one another. However, structures in which this is not the case are also considered. A generator can then likewise provide a DC voltage by means of a rectifier. In addition, however, each inverter then has an individual step-up converter, by means of which each inverter individually increases the DC voltage and as a result feeds the DC voltage intermediate circuit thereof.

With respect to details of the inverters 201-203, details of the first inverter 201 are now described, which are likewise present correspondingly in the other inverters. A chopper circuit 258 and a three-phase circuit arrangement 260 are connected to the DC voltage intermediate circuit, represented by the intermediate circuit capacitor 256. To generate a three-phase alternating current, the circuit arrangement 260 thus has two semiconductor switches for each phase, with the result that the circuit arrangement 260 has a total of six semiconductor switches. The semiconductor switches 261 and 262 are thus provided for one of the three phases. Of course, the same arrangement is also provided analogously in each case for the other phases. Reference signs are shown only for the two semiconductor switches 261 and 262 of the one phase purely for the sake of clarity. The semiconductor switches 261 and 262 thus form a switch pair and accordingly one switch pair is provided for each phase.

The circuit arrangement 260 thus generates a three-phase output current and this is guided via the output inductor 231 or the three-phase output current is first produced by the output inductor 231, specifically from the voltage pulses that the circuit arrangement 260 generates.

Furthermore, the output filter 211 is provided, which is intended to filter harmonics that are caused by the switching pulses.

Finally, the current is guided via the isolating switch 221 and hence output by the inverter 201.

A control device element (controller) 268 is provided to individually control the circuit arrangement 260 and also the chopper circuit 258. The control device element 268 is actuated by a central control unit (central controller) 270. The central control unit 270 also controls the isolating switches 221. For the actuation of both the control device element 268 and the respective isolating switch of the relevant inverter unit, FIG. 2 shows in each case a separate actuation system by way of the central control unit 270. However, consideration is also given to the central control unit 270 that actuates the control device element and the actuation of the isolating switch 211 being carried out starting from the control device element 268. When an inverter is operated as a blocked inverter, the central control unit 270 can provide a corresponding signal or a corresponding command to the control device element 268. The control device element 268 then blocks the control of the circuit arrangement, that is to say of the six semiconductor switches, including the semiconductor switches 261 and 262 mentioned.

A blocking switch 272 is illustrated to demonstrate this. However, this blocking switch is to be understood, in particular, symbolically and can be implemented accordingly by control instruction or implementing the control in the control device element 268. In particular, the blocking switch 272 or the action thereof can thus also be implemented using software.

When an inverter, in the example that is to say the first inverter 201, is operated as a blocked inverter, the blocking switch 272 is therefore open but the isolating switch 221 is closed. The inverter 201 then still has the full functionality, particularly when the blocking switch 272 is implemented only by way of corresponding switching commands, since this blocking symbolized by the blocking switch 272 can be canceled without delay. In this respect, without delay is to be understood as meaning that there is no delay greater than is required anyway to switch a semiconductor switch.

In contrast, the isolating switch 221 is present as a real hardware switch; the same also applies of course to the isolating switches 222 and 223. This takes longer to actuate. Apart from this, the inverter 201 can also be in a different state when the isolating switch 221 is open.

Particularly when the DC intermediate circuit of the inverter 201 is not galvanically connected to the DC voltage intermediate circuits of the other inverters, the intermediate circuit voltage 274 can decrease and would have to be charged first if the inverter 201 is then intended to feed in again.

FIG. 2 therefore also illustrates the possible operating states of an inverter, in this case specifically in a manner representative of the first inverter 201. If the inverter 201 is operated as an active inverter, the isolating switch 221 is closed and the symbolic blocking switch 272 is likewise closed. If the inverter 201 is operated as a blocked inverter, the isolating switch 221 is closed and the symbolic blocking switch 272 is open. If the inverter 201 is operated as an isolated inverter, the isolating switch 221 is open and the symbolic blocking switch 272 can then expediently likewise be open.

Figure 3:
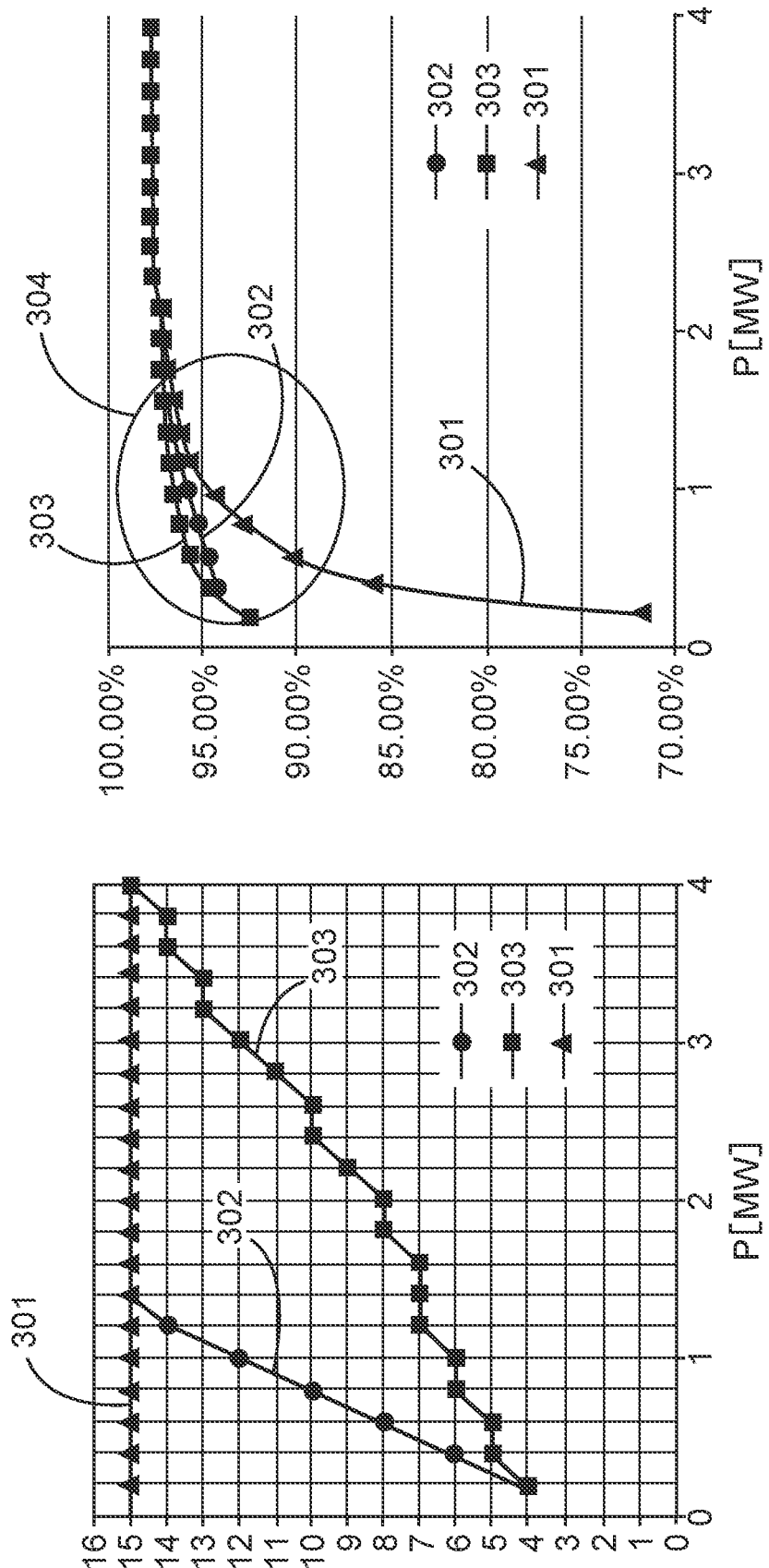
FIG. 3 shows two graphs for illustrating the distribution and effect of a plurality of inverters of an inverter arrangement.

FIG. 3 overall illustrates the effect of an infeed unit when individual inverters are operated as active, blocked or isolated inverters.

The illustration is for an infeed unit with a nominal power of 4 MW. The associated infeed unit has a total of 15 inverters. The number of inverters, which can also be referred to as converters, is plotted on the ordinate. The abscissa shows the output power that can be generated or that is to be generated in MW.

It can be seen that, at an output power of 4 MW, the nominal power is achieved and therefore all 15 inverters are operated as active inverters.

Otherwise, this left-hand graph of FIG. 3 compares three variants of how the inverters can be operated.

In accordance with the first variant 301, which is symbolized by triangles, all of the inverters are operated as active inverters. Each inverter thus reduces its own partial power depending on how much output power can be generated overall.

In accordance with the second variant 302, which is symbolized by rhombuses, some inverters are not operated at all at a low output power, that is to say are isolated and thus operated as isolated inverters. In order to be able to react quickly enough to power fluctuations, some of the inverters are first disconnected at low values of the output power, that is to say are operated as isolated inverters, specifically only approximately up to an output power of 1.2 MW. At lower output powers, an appropriate number of inverters are then disconnected. However, there are always at least four inverters in operation as active inverters. At an output power of more than 1.2 MW, all of the inverters are operated as active inverters. Therefore, even from approximately a third of the nominal power of the infeed unit, all of the inverters are thus operated as active inverters.

In accordance with the third variant 303, it is proposed to operate one or more of the inverters as blocked inverters depending on the output power, that is to say when the output power is below the nominal power of the infeed unit. Such an inverter that is operated as a blocked inverter can immediately be operated again as an active inverter when required. It is therefore also possible to operate an inverter as a blocked inverter at an output power of approximately 3.8 MW. This can be gathered from the graph, symbolized by the squares. It can be seen that, essentially almost proportionally to the decrease of the output power, accordingly fewer inverters also have to be operated as active inverters.

The right-hand graph explains the improvement in the efficiency that can be achieved. Accordingly, the right-hand graph illustrates the efficiencies that can be achieved for the three different types of control that have been explained in the left-hand graph.

Accordingly, it can be seen that the first variant 301, which always operates all of the inverters as active inverters, has a very poor efficiency at very low output powers. For the sake of better comparability, the profiles of the efficiencies of the right-hand graph use the same reference signs as the associated illustration of the number of active inverters of the left-hand graph.

The efficiency can be increased by virtue of some inverters being operated as isolated inverters at very low output powers. At very low output powers, this increase in the efficiency is identical in the second and third variant 302, 303.

However, precisely at an output power approximately in the first third, it can be seen that the third variant can achieve an even higher efficiency. The efficiencies that can be achieved then converge only at higher powers.

The following has thus been recognized:

Converters of wind power installations and also storage systems (especially in the case of primary control power delivery) operate most of the time in the part-load range. The converter system consists of individual inverters operating in parallel, which can also be considered or referred to as power cabinets. For reasons of efficiency, power cabinets that are not required can be disconnected. Due to the dead time during switch-on and in order to prevent too frequent switching of the network contactors, which can also be referred to as isolating switches, (especially given turbulent wind conditions), a high hysteresis must be used.

From the point of view of the network, the disconnection is undesired in many networks because wind power installations are intended to feed the full apparent current into the network as fault current in the event of a fault. This desired functionality can also be referred to as FRT with dynamic network backup.

The solution proposed here makes it possible to achieve such FRT with dynamic network backup and at the same time to improve the part-load efficiency by virtue of the development of an option to deactivate individual converters, which can also be referred to as inverters, (in order to increase the efficiency) but without a reduced reactive current having to be accepted in the event of a fault.

In particular, significant extra yields of up to +2.5% yield compared to variants that exhibit the mentioned FRT properties can be achieved, but for this purpose all power cabinets are left permanently in operation, that is to say all of the inverters are always operated as active inverters.

Extra yields can also be achieved compared to a variant in which some inverters are disconnected completely.

The solution can provide a solution that implements FRT behavior without impairing the power curve of the inverter arrangement, in particular of a wind power installation or of a storage system, in the process.

In particular, there is an improvement in the power curve compared to the prior art, in which inverters are always isolated from the network when they are not operated as active inverters.

This results in a potential for increasing yields for wind farms. A significant improvement in the power curve and the yields is produced compared to installations that have permanently switched on all of the inverters, which can also be referred to as converters.

The idea is to implement these increases in yield using an asymmetric current feed of the individual converters, according to which the current is not distributed symmetrically across the converters that are switched on.

Accordingly, individual converters are not galvanically isolated from the network but instead remain connected; however, the pulses of the circuit arrangement are blocked.

Owing to the very rapid reaction time upon the unblocking of the pulses, both the fault current can be produced according to optimum FRT with dynamic network backup and a high hysteresis during connection and disconnection can be prevented. The individual converters can thus be operated in a wide load range at the efficiency maximum.

In total, the efficiency of the proposed solution with optimum FRT with dynamic network backup can even be improved compared to the state with the galvanic disconnection, as is shown in FIG. 3. The circle 304 highlights the improvement.

An important point of the idea is thus not to galvanically disconnect the converters by means of the network contactors but instead to block the pulses of the converters that are to be disconnected. Since the blocking can be withdrawn and switched-on again within a few ms and no wear is produced anywhere in the converter, in comparison to the network contactors that are worn due to frequent switching, so many converters can continuously exchange power with the network that the overall losses are minimal.

The optimum operating point can be determined statically by virtue of an appropriate number of converters or inverters operating for instance proportional to the apparent current, that is to say operating as active inverters. In addition, the reactive power operating point can also be taken into account such that the number of active converters, that is to say the actively operating inverters, depends on the active current and reactive current that is generated or is intended to be generated overall by the inverter arrangement.

Furthermore, a model-based determination of the optimum operating point is proposed as a further variant. For this, it is proposed that optionally more influencing variables could be taken into account, in particular temperature, voltage and possibly further influencing variables.

As another variant, it is proposed that losses are detected metrologically and the number of converters are controlled according to an algorithm that is capable of learning.

In addition, a combination of galvanic disconnection and asymmetrical feeding can be provided. Additionally, the filter currents can thus also be reduced. This is useful in installations that are intended to provide no or only restricted dynamic network backup. The rapid changes in the active and reactive currents are navigated in this case via the asymmetrical feeding. In the case of greater changes in the current loading, additional converters are galvanically connected.

It has furthermore been recognized that, when the pulses are blocked, the intermediate circuit must be kept to the nominal voltage. This can be effected by a temporary release of the blocking, which lasts approximately in the range of 5 ms. The reaching of a voltage upper or lower limit is also conceivable. The repercussions due to the sudden flow of current can be reduced by recharging regulation. An external charging circuit would also be another option.

It has furthermore been recognized that, when individual cabinets are activated and deactivated, the current has to be taken over/output by the activated/deactivated unit. This can be effected using controlled ramps that can be parameterized in order to reduce repercussions.

The asymmetrical feeding can result in the monitoring processes becoming effective (for example chopper load on account of a simple monitoring process without a thermal model). For this purpose, monitoring of the circulating currents and monitoring of the recharging of the inactive intermediate circuits is proposed.

Voltage and current limits (for example in the step-up converter) can also be achieved. For this purpose, a monitoring system that takes into account the technical limits but also the protective limits and prevents disconnection is provided.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for feeding electrical power into an electrical supply network using an inverter-controlled infeed unit, comprising:
    feeding, by an inverter arrangement including a plurality of inverters, an output power into the electrical supply network;
    selectively galvanically isolating each inverter of the plurality of inverters from the electrical supply network using an associated isolating switch of a plurality of isolating switches, each inverter of the plurality of inverters being associated with a circuit including a plurality of switches configured to generate a sinusoidal output current using pulsed actuation of the circuit;
    generating a plurality of partial powers by the plurality of inverters, respectively;
    summing the plurality of partial powers to produce the output power;
    depending on the output power, operating one or more first inverters of the plurality of inverters as active inverters that respectively generate a partial power, and
    depending on the output power, operating one or more second inverters of the plurality of inverters as passive inverters that respectively do not generate a partial power, wherein one or more of the passive inverters are operated as blocked inverters and remain galvanically coupled to the electrical supply network.

2. The method as claimed in claim 1, wherein the inverter-controlled infeed unit is a wind power installation or a storage system.

3. The method as claimed in claim 1, comprising:
    suppressing the pulsed actuation to prevent each blocked inverter from respectively generating the partial power;
    ending the suppressing using a triggering signal; and
    in response to ending the suppressing using the triggering signal, generating the respective partial power by the blocked inverter.

4. The method as claimed in claim 3, comprising:
    operating each blocked inverter in a standby mode in which each blocked inverter functions as an active inverter with the pulsed actuation suppressed.

5. The method as claimed in claim 2, wherein:
    the wind power installation or the storage system is associated with a maximum power that is an upper limit for the output power,
    all of the plurality of inverters are operated as active inverters and respectively generate the plurality of partial powers when the output power reaches the maximum power, and
    one or more of the plurality of inverters are operated as passive inverters when the output power is below the maximum power at least by a predeterminable power interval, wherein the maximum power, the output power and the power interval are checked as an apparent power, active power or reactive power, and/or implemented by checking an infeed apparent current, an infeed active current or an infeed reactive current.

6. The method as claimed in claim 1, comprising:
    operating one or more passive inverters as blocked inverters that remain galvanically connected to the electrical supply network; and
    operating one or more further passive inverters as isolated inverters that are respectively galvanically isolated from the electrical supply network using respective isolating switches.

7. The method as claimed in claim 6, wherein:
    a filter circuit is provided for each inverter to filter the output current generated by the inverter, and
    the filter circuit in the isolated inverters is galvanically isolated from the electrical supply network using an isolating switch of the inverter.

8. The method as claimed in claim 1, comprising:
    selecting an inverter as active inverter or passive inverter and/or selecting the passive inverter as a blocked inverter or isolated inverter depending on:
    a magnitude of an apparent current to be fed in,
    a magnitude of an active current to be fed in, a magnitude of a reactive current to be fed in,
at least one detected loss of the inverter arrangement,
a detected temperature of the inverter arrangement,
an intermediate circuit voltage of a joint DC voltage intermediate circuit of the inverter arrangement,
a network voltage of the electrical supply network, and/or
a fluctuation range of the output power.

9. The method as claimed in claim 1, comprising:
modelling a behavior of the inverter arrangement using a model; and
selecting inverters as active inverters or passive inverters depending on a behavior of the model.

10. The method as claimed in claim 9, comprising:
selecting passive inverters as blocked inverters or isolated inverters depending on a behavior of the model.

11. The method as claimed in claim 1, comprising:
modelling a behavior of the inverter arrangement using a model;
simulating the model using a test configuration; and
specifying the test configuration by a selection of inverters as active inverters or as passive inverters.

12. The method as claimed in claim 11, comprising:
specifying the test configuration by a selection of the passive inverters as blocked inverters or as isolated inverters;
varying test configurations;
simulating the model for each test configuration to obtain a simulation result for each test configuration; and
selecting a new configuration depending on the simulation result.

13. The method as claimed in claim 12, comprising:
selecting the new configuration by evaluating boundary conditions.

14. The method as claimed in claim 1, comprising:
selecting inverters as active inverters or as passive inverters for a level of the output power;
operating the inverter-controlled infeed unit or simulating a model using the selecting of the inverters;
detecting an efficiency measure as a result of operating the inverter-controlled infeed unit or simulating the model;
storing the selection, the level of the output power and the efficiency measure as a reference configuration; and
after a change in the level of the output power, selecting the inverters as active inverters or as passive inverters depending on at least one reference configuration.

15. The method as claimed in claim 14, comprising:
storing at least one property or boundary condition as the reference configuration.

16. The method as claimed in claim 1, comprising:
detecting respective inverter temperatures of the plurality of inverters; and
selecting the inverter as an active inverter or as a passive inverter depending on the inverter temperature or a comparison of the inverter temperatures.

17. The method as claimed in claim 16, wherein the inverter temperature is a temperature of the circuit of the inverter and the selection of the inverter is changed depending on the inverter temperatures.

18. The method as claimed in claim 1, wherein
each inverter of the plurality of inverters has a DC voltage intermediate circuit having an intermediate circuit voltage, and
an intermediate circuit control system configured to keep the intermediate circuit voltage in a voltage band is provided for the blocked inverters.

19. The method as claimed in claim 1, wherein
when an active inverter changes to a passive inverter, the partial power generated by the active inverter before the change is distributed across remaining active inverters,
a transition specification is provided for the distribution across the remaining active inverters, and
the transition specification specifies a temporal reduction profile for reducing the partial power of the changing active inverter, and/or the transition specification respectively specifies a temporal increase profile for increasing the partial powers of the remaining active inverters.

20. The method as claimed in claim 1, wherein the temporal reduction profile and/or the temporal increase profile are each formed as ramps having a slope.

21. The method as claimed in claim 1, wherein
a central controller is provided to control the inverter arrangement, and
the central controller monitors effects by selecting the active, passive, blocked and/or isolated inverters on operating states of the inverter arrangement.

22. The method as claimed in claim 21, wherein monitoring the effects includes:
monitoring a reaction of a chopper circuit;
monitoring an occurrence of circulating currents; and
monitoring whether current limits are reached, wherein the control of the inverter arrangement is changed depending on a result of the monitoring.

23. The method as claimed in claim 1, comprising:
predicting or specifying a change in the output power to be expected; and
operating the passive inverters as blocked or isolated inverters depending on the change in the output power to be expected, wherein:
the change in the output power to be expected is divided into a proportion of rapid changes in the output power and a proportion of slow changes in the output power, and
the more passive inverters are operated as blocked inverters, the greater the proportion of predicted rapid changes in the output power, and/or
a proportion of blocked inverters to passive inverters is in a range of 90%-100% when the change in the output power is greater in terms of magnitude than 20% of a nominal power of the inverter arrangement per second.

24. A wind power installation or storage system for feeding electrical power into an electrical supply network, comprising
an inverter arrangement having a plurality of inverters for generating an output power and for feeding the output power into the electrical supply network, wherein
each inverter of the plurality of inverters has an associated isolating switch of a plurality of isolating switches to galvanically isolate the inverter from the electrical supply network,
each inverter of the plurality of inverters has a circuit including switches to generate a sinusoidal output current using pulsed actuation of the circuit,
each inverter of the plurality of inverters is configured to generate a variable partial power of a plurality of partial powers, and
the inverter arrangement is coupled in that the output power is produced as the sum of the plurality of partial powers; and a central controller configured to:
control the inverter arrangement;
depending on the output power, operate one or more first inverters of the plurality of inverters as active inverters that respectively generate a partial power; and
depending on the output power, operate one or more second inverters of the plurality of inverters as passive inverters that respectively do not generate a partial power, wherein operating the one or more second inverters as passive inverters includes operating at least one inverter of the one or more passive inverters as a blocked inverter and maintaining the at least one inverter galvanically coupled to the electrical supply network.

* * * * *